United States Patent
Vitthaladevuni et al.

(10) Patent No.: US 11,044,005 B2
(45) Date of Patent: *Jun. 22, 2021

(54) TECHNIQUES FOR COMMUNICATING FEEDBACK IN WIRELESS COMMUNICATIONS

(71) Applicant: QUALCOMM Incorporated, San Diego, CA (US)

(72) Inventors: Pavan Kumar Vitthaladevuni, San Diego, CA (US); Yu Zhang, Beijing (CN); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/465,477

(22) PCT Filed: Jan. 6, 2017

(86) PCT No.: PCT/CN2017/070443
§ 371 (c)(1),
(2) Date: May 30, 2019

(87) PCT Pub. No.: WO2018/126444
PCT Pub. Date: Jul. 12, 2018

(65) Prior Publication Data
US 2020/0067592 A1 Feb. 27, 2020

(51) Int. Cl.
*H04B 7/08* (2006.01)
*H04B 7/06* (2006.01)
*H04B 17/345* (2015.01)

(52) U.S. Cl.
CPC ......... *H04B 7/0865* (2013.01); *H04B 7/0617* (2013.01); *H04B 7/063* (2013.01); *H04B 7/0634* (2013.01); *H04B 17/345* (2015.01)

(58) Field of Classification Search
CPC .... H04B 7/0617; H04B 7/063; H04B 7/0634; H04B 17/345; H04B 7/0865; H04B 17/00; H04B 17/336
(Continued)

(56) References Cited

U.S. PATENT DOCUMENTS 7,054,664 B2  5/2006 Nagaraj
2007/0254607 A1 11/2007 Bandemer et al.
(Continued)

FOREIGN PATENT DOCUMENTS

CN   101902298 A   12/2010
CN   102594491 B   12/2014
(Continued)

OTHER PUBLICATIONS

International Search Report and Written Opinion—PCT/CN2017/078029—ISA/EPO—dated Nov. 14, 2017.
(Continued)

*Primary Examiner* — Leila Malek
(74) *Attorney, Agent, or Firm* — Qualcomm Incorporated

(57) ABSTRACT

Aspects of the present disclosure describe receiving, from an access point, an indication of at least one of a beamforming method for beamforming a RS or a normalization method for normalizing power for beamforming the RS. A channel covariance matrix corresponding to interference over a plurality of antenna ports can be generated, as well as a RS beamforming matrix based at least in part on modifying the channel covariance matrix and on the normalization method. The RS can be generated based on the RS beamforming matrix and the beamforming method. The RS can be transmitted to the access point based on the RS beamforming matrix.

50 Claims, 6 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2010/0058132 A1* | 3/2010 | Kumar | H04W 52/48 |
| | | | 714/748 |
| 2011/0002263 A1* | 1/2011 | Zhu | H04W 52/10 |
| | | | 370/328 |
| 2012/0093200 A1 | 4/2012 | Kyeong | |
| 2013/0102243 A1 | 4/2013 | Gunnarsson et al. | |
| 2014/0112168 A1 | 4/2014 | Chen et al. | |
| 2015/0092583 A1 | 4/2015 | Balraj et al. | |
| 2015/0358063 A1 | 12/2015 | Farkas et al. | |
| 2016/0013838 A1 | 1/2016 | Zhu et al. | |
| 2016/0020843 A1* | 1/2016 | Li | H04W 28/0289 |
| | | | 375/267 |
| 2016/0344524 A1 | 11/2016 | Kim et al. | |
| 2016/0360326 A1 | 12/2016 | Bergmann et al. | |
| 2017/0041057 A1 | 2/2017 | Kim et al. | |
| 2020/0052852 A1 | 2/2020 | Vitthaladevuni et al. | |

FOREIGN PATENT DOCUMENTS

| | | |
|---|---|---|
| CN | 104521155 A | 4/2015 |
| CN | 105940552 A | 9/2016 |
| WO | 2008088353 A1 | 7/2008 |

OTHER PUBLICATIONS

International Search Report and Written Opinion—PCT/CN2017/070443—ISA/EPO—dated Sep. 27, 2017.

Mitsubishi Electric: "Discussion on Precoded SRS", 3GPP TSG RAN WG1 #57bis Meeting, 3GPP Draft, R1-092441, 3rd Generation Partnership Project (3GPP), Mobile Competence Centre, 650, Route Des Lucioles, F-06921 Sophia-Antipolis Cedex, France, No. Los Angeles, USA, Jun. 23, 2009, Jun. 23, 2009 (Jun. 23, 2009), Jun. 29, 2009-Jul. 3, 2009, pp. 1-6, XP050350953, [retrieved on Jun. 23, 2009] paragraphs [0002]. [3.4)]. [5.2)], figures 2,3.

Qualcomm Incorporated: "Views on RS for CSI Acquisition", 3GPP TSG-RAN WG1 #86bis, 3GPP Draft; R1-1610151, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 9, 2016 (Oct. 9, 2016), pp. 1-5, XP051150174, Retrieved from the Internet: URL: http://www.3gpp.org/ftp/ Meetings_3GPP_SYNC/RAN1/Docs/ [retrieved on Oct. 9, 2021], Sections 2.2 and 2.2.4.

Qualcomm Incorporated: "Views on SRS", 3GPP TSG-RAN WG1 #87, 3GPP Draft; R1-1612049, 3rd Generation Partnership Project (3GPP), Mobile Competence Centre; 650, Route Des Lucioles; F-06921 Sophia-Antipolis Cedex; France, vol. RAN WG1, No. Reno, Nevada, USA; Nov. 14, 2016-Nov. 18, 2016, Nov. 13, 2016 (Nov. 13, 2016), pp. 1-4, XP051176010, Retrieved from the Internet: URL: http://www.3gpp.org/ftp/Meetings_3GPP SYNC/RAN1/Docs/ [retrieved on Nov. 13, 2016], Section 2.4.

Supplementary European Search Report—EP17890279—Search Authority—The Hague—dated Jul. 24, 2020.

Mitsubishi Electric: "Exploiting Channel Reciprocity in TDD/MIMO with Asymmetric Interference", 3GPP Draft, 3GPP TSG RAN WG1 #55bis meeting, R1-090042, 3rd Generation Partnership Project (3GPP), Mobile Competence Centre, 650 Route Des Lucioles, F-06921 Sophia-Antipolis Cedex, France, No. Ljubljana, Jan.7, 2009, Jan. 7, 2009 (Jan. 7, 2009), XP050317991, pp. 1-6, [retrieved on Jan. 7, 2009], Sections 2.1, 2.2, p. 1-p. 3, p. 5, paragraph 1.

\* cited by examiner

TECHNIQUES FOR COMMUNICATING FEEDBACK IN WIRELESS COMMUNICATIONS

CROSS-REFERENCE TO RELATED APPLICATION

This application is a 35 U.S.C. § 371 National Phase Application of PCT Application No. PCT/CN2017/070443 filed Jan. 6, 2017, entitled "TECHNIQUES FOR COMMUNICATING FEEDBACK IN WIRELESS COMMUNICATIONS," which is assigned to the assignee hereof and hereby expressly incorporated by reference herein for all purposes.

BACKGROUND

Aspects of the present disclosure relate generally to wireless communication systems, and more particularly, to communicating feedback in wireless communication systems.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

For example, for 5G communications technology and beyond, communications may have tight timing constraints due to physical layer design. As such, explicit feedback of interference from a user equipment (UE) to an access point (e.g., evolved Node B (eNB), gNB, etc.) may not be desirable as such feedback may include matrix of $n^2$ real numbers for a UE with n antennas (e.g., 16 real numbers for 4 antennas). Moreover, if a UE is using more complex receivers than a minimum mean square error (MMSE), the feedback may not be useful for the access point.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for transmitting reference signals (RSs) in wireless communications is provided. The method includes receiving, from an access point, an indication of at least one of a beamforming method for beamforming a RS or a normalization method for normalizing power for beamforming the RS, generating a channel covariance matrix corresponding to interference over a plurality of antenna ports, generating a RS beamforming matrix based at least in part on modifying the channel covariance matrix and on the normalization method, generating the RS based on the RS beamforming matrix and the beamforming method, and transmitting, to the access point, the RS based on the RS beamforming matrix.

In another example, a method for configuring RS transmissions in wireless communications is provided. The method includes transmitting, to a user equipment (UE), an indication of at least one of a beamforming method for beamforming an RS or a normalization method for normalizing power for beamforming the RS, receiving, from the UE, a RS generated based on a RS beamforming matrix, computed from a channel covariance matrix determined by the UE and the normalization method, and processing, based on at least one of the beamforming method or the normalization method, the RS received from the UE to determine interference for the UE.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
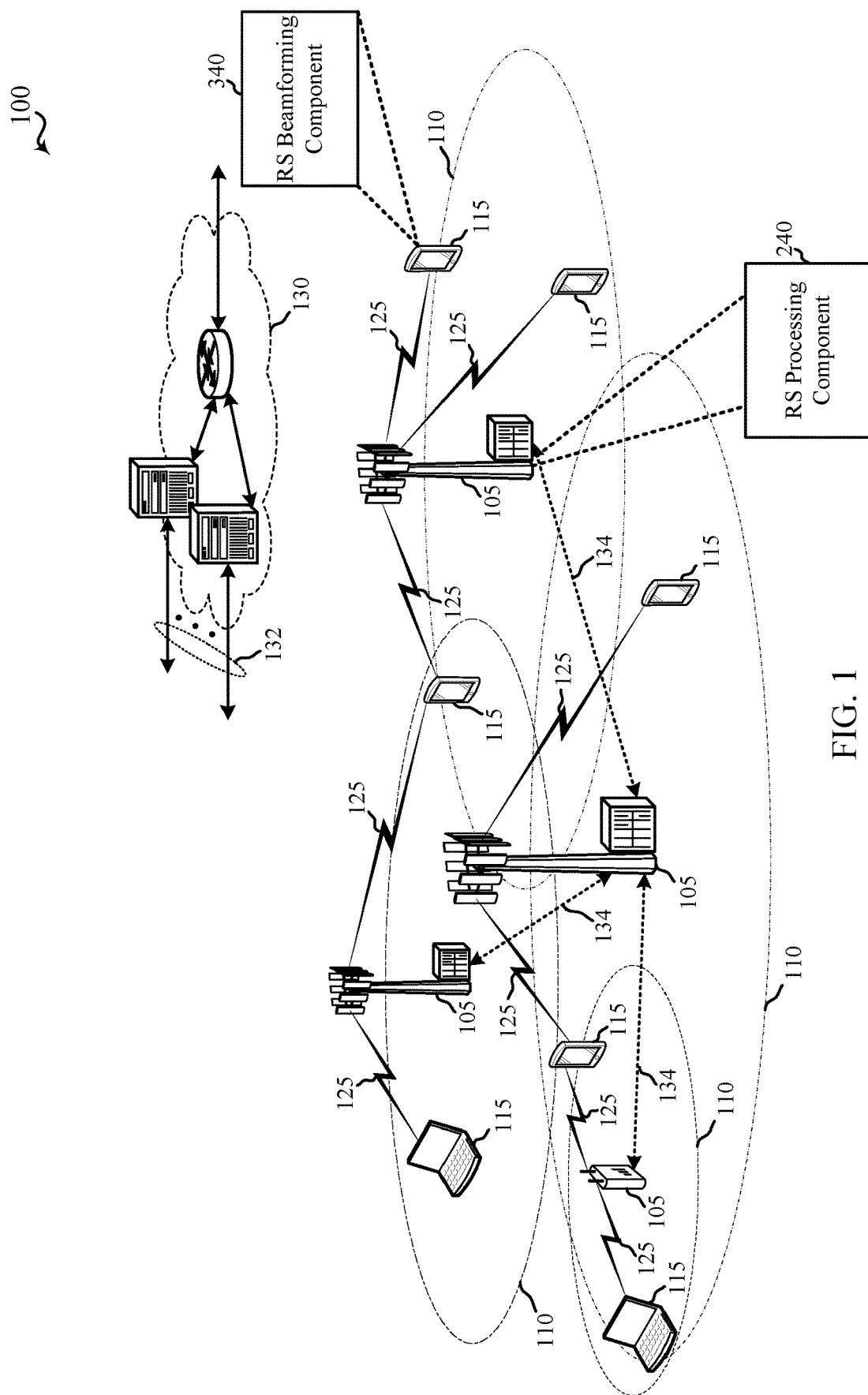
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to reporting feedback using less than a n×n matrix for a device having n antennas. For example, the device can report feedback in the form of a beamformed reference signal (RS) and an associated normalization vector to allow another device receiving the feedback to determine quality of the wireless communications, make associated scheduling decisions, etc. For example, a user equipment (UE) can measure interference over a plurality of antennas and generate a channel covariance matrix. The UE can determine a beamforming matrix based on the channel covariance matrix for transmitting a beamformed reference signal. The UE can also normalize power for the beamformed RS based on applying a normalization method to the beamforming matrix. The UE can accordingly transmit the beamformed RS to the base station based on the normalized beamforming matrix. In addition, the UE may transmit a normalization vector associated with the applied normalization to the base station. The base station may accordingly determine interference conditions of the channel based on receiving the beamformed RS, and using the normalization vector to determine associated power normalization factors. The base station may, in an example, accordingly determine a rank for scheduling uplink communication resources for the UE.

In an example, the base station can signal, to the UE, the normalization method to be used. In addition, in an example, the base station can signal, to the UE, a beamforming method to be used in generating the beamformed RS (e.g., whether to beamform on one antenna port per symbol, per resource block (RB), per sub-band, etc., whether to use wideband beamforming, etc.). Additionally, as described herein, a UE can generate the beamformed RS and/or corresponding normalization vector for transmitting to the base station, such as an evolved Node B (eNB), gNB, etc. In some examples, however, the base station can generate beamformed RS and/or corresponding normalization vector for transmitting to the UE. In other examples, the devices can be other wireless communication devices (e.g., a relay, remote radio head, peer-to-peer device, other access points, etc.).

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a network entity, a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may be or include a Long Term Evolution (LTE) or LTE-Advanced (LTE-A) network. The wireless communication system 100 may also be a next generation network, such as a 5G wireless communication network. In LTE/LTE-A networks, the term evolved node B (eNB), gNB, etc. may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB, gNB, etc. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A packet data convergence protocol (PDCP) layer can provide header compression, ciphering, integrity protection, etc. of IP packets. A radio link control (RLC) layer may perform packet segmentation and reassembly to communicate over logical channels. A media access control (MAC) layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or the like. A UE may be able to communicate with various types of base stations and network equipment including macro eNBs, small cell eNBs, relay base stations, and the like.

The communication links 125 shown in wireless communication system 100 may carry UL transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In aspects of the wireless communication system 100, a UE 115 may include a RS beamforming component 340 for generating and transmitting a beamformed RS to a base station 105. In this example, the base station 105 may include a RS processing component 240 to receive and process the RS from the UE 115 (e.g., for scheduling resources for UE 115 communications, determining a rank for UE 115 communications, etc.). For example, the RS beamforming component 340 can generate a beamforming matrix for applying to the RS based on a determined channel covariance matrix. Covariance matrices may be used to estimate the correlation of noise and interference. Noise and/or data covariance information in the form of a covariance matrix may be used by wireless receivers to suppress interference in received signals. Such receivers may suppress interference by determining weighting factors based on the covariance matrix and using the weighting factors to weight and combine the received signals. For example, RS beamforming component 340 can generate the beamforming matrix from the channel covariance matrix, and can normalize power for applying to the multiple antennas of the UE 115 for beamforming a RS transmission. The RS beamforming component 340 can also communicate normalization information to the base station 105 to allow the base station 105 receiving the RS to appropriately process the RS to determine one or more parameters related to a channel quality or interference experienced by the UE 115 over a given antenna thereof. RS processing component 240 can accordingly process the RS and determine a rank for uplink transmissions from the UE 115, which the base station 105 can communicate to the UE 115 in one or more scheduling grants.

Figure 2:
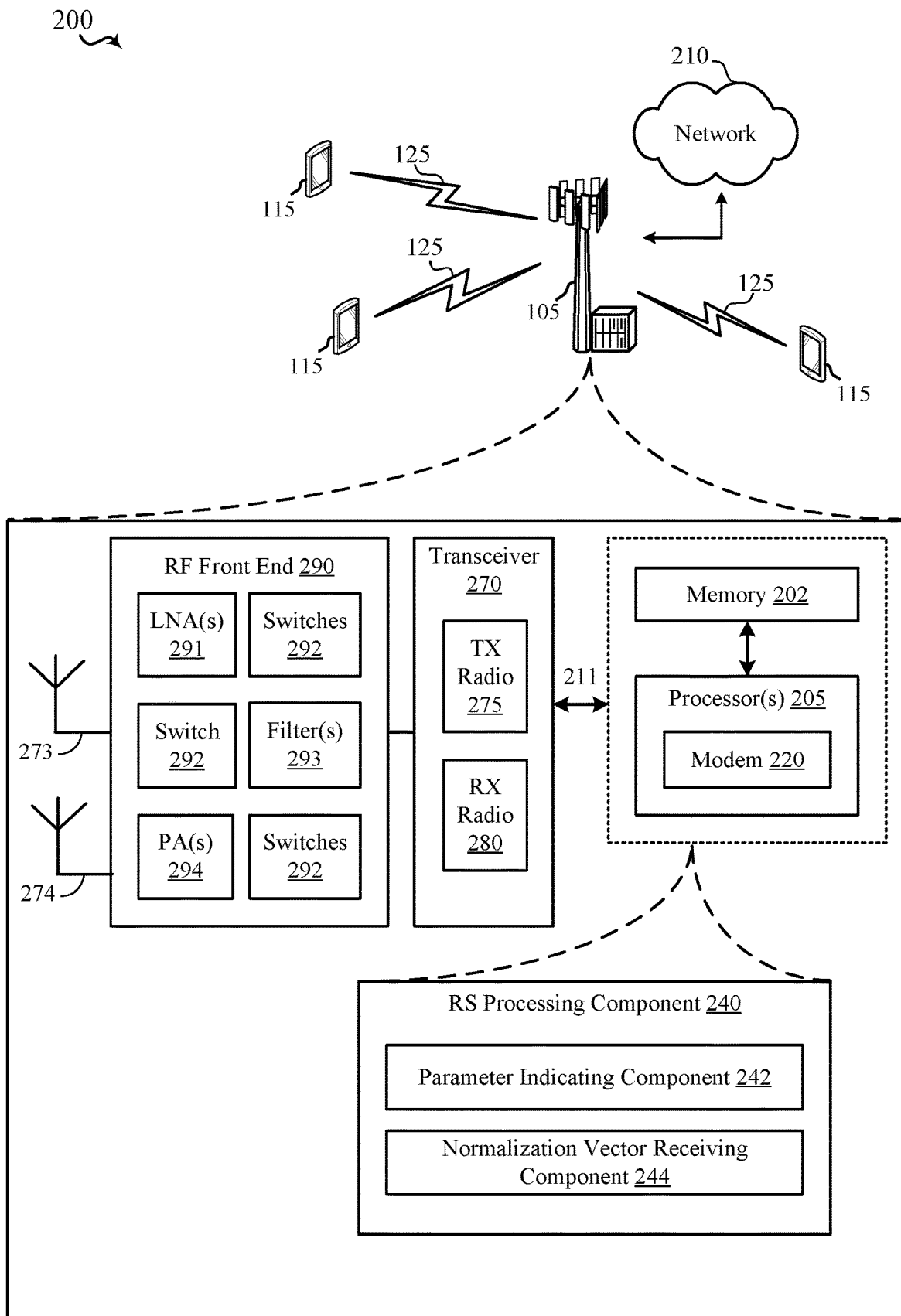
FIG. 2 is a block diagram illustrating an example of a base station, in accordance with various aspects of the present disclosure.
Figure 3:
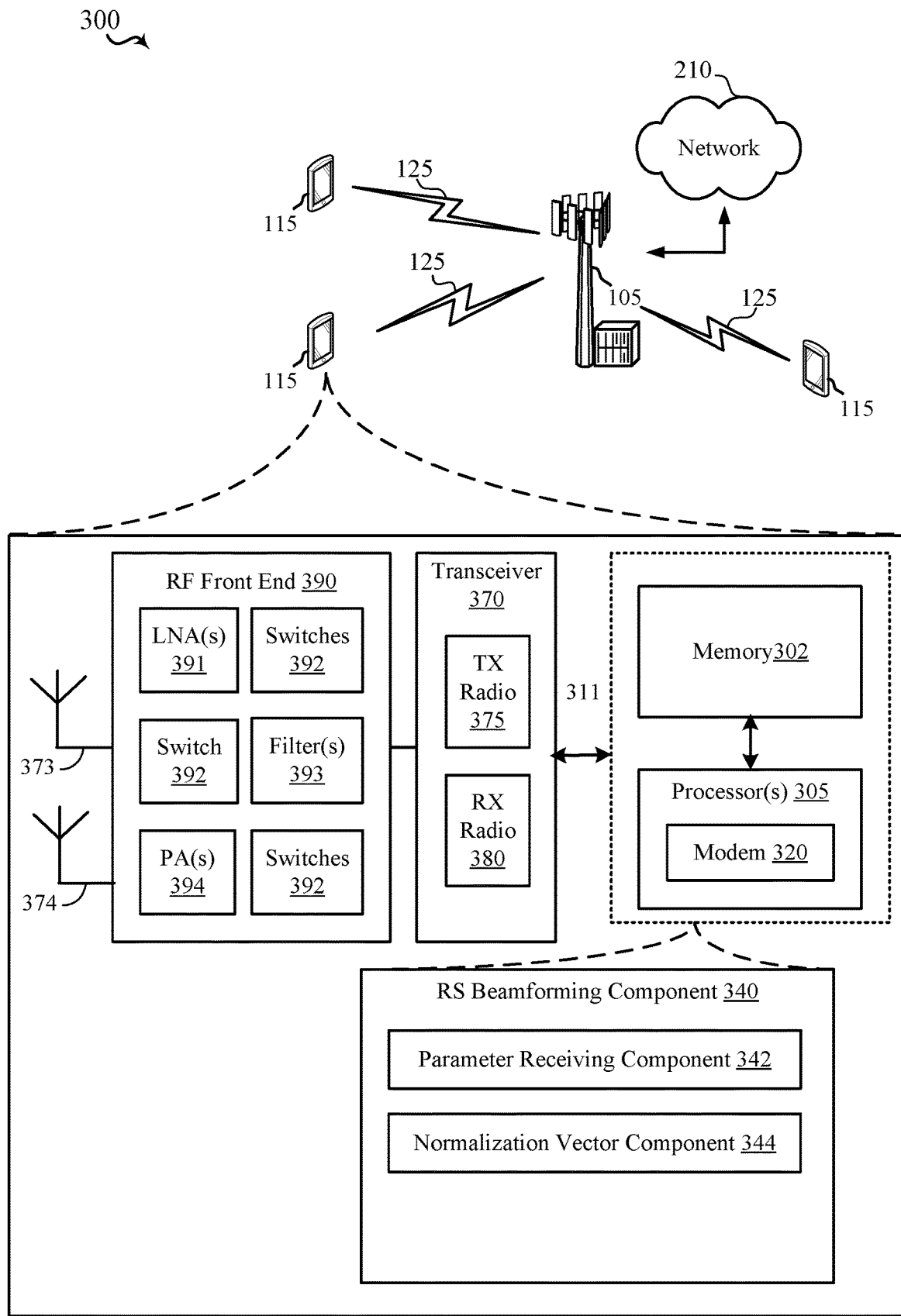
FIG. 3 is a block diagram illustrating an example of a UE, in accordance with various aspects of the present disclosure.
Figure 4:
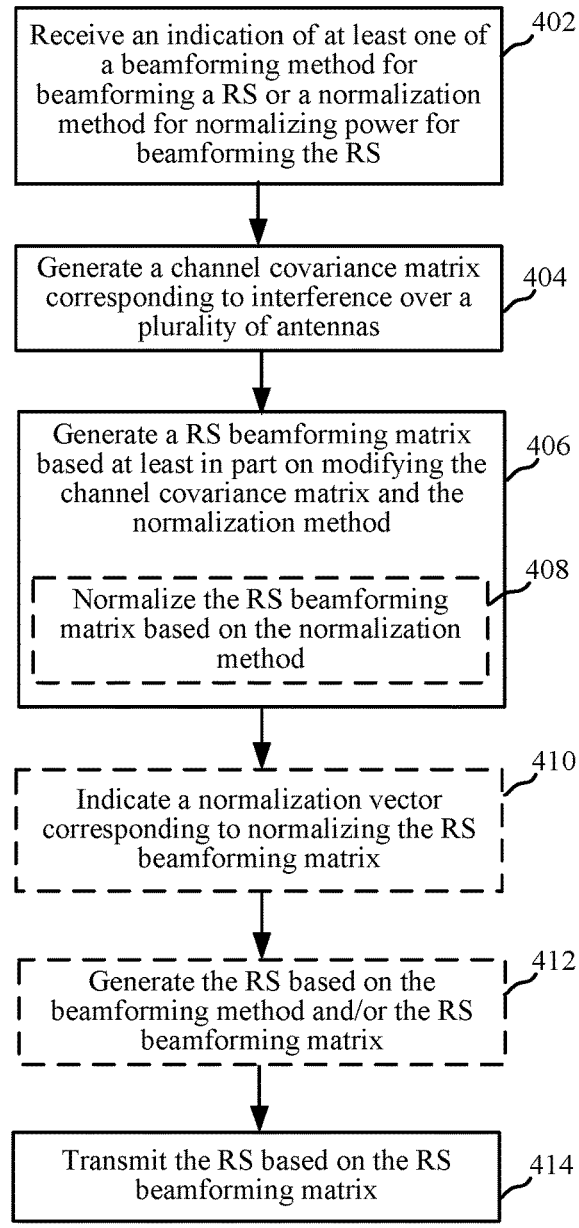
FIG. 4 is a flow chart illustrating an example of a method for beamforming reference signals, in accordance with various aspects of the present disclosure.
Figure 5:
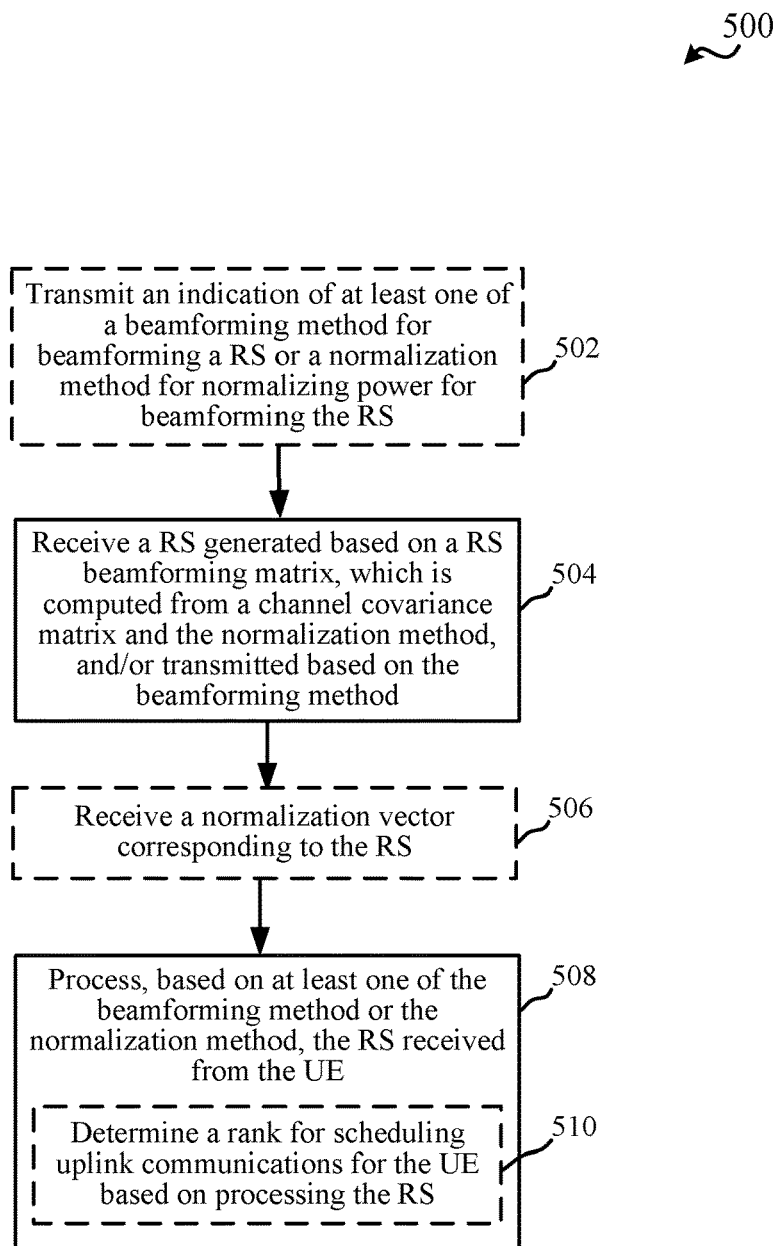
FIG. 5 is a flow chart illustrating an example of a method for processing reference signals, in accordance with various aspects of the present disclosure.

Turning now to FIGS. 2-5, aspects are depicted with reference to one or more components and one or more methods that may perform the actions or operations described herein, where aspects in dashed line may be optional. Although the operations described below in FIGS. 4 and 5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, a block diagram 200 is shown that includes a portion of a wireless communications system having multiple UEs 115 in communication with a base station 105 via communication links 125, where the base station 105 is also connected to a network 210. The UEs 115 may be examples of the UEs described in the present disclosure that are configured to generate and transmit beamformed RSs. Moreover the base station 105 may be an example of the base stations described in the present disclosure (e.g., eNB, gNB, etc. providing one or more macrocells, small cells, etc.) that are configured to process beamformed RSs received from one or more UEs.

In an aspect, the base station in FIG. 2 may include one or more processors 205 and/or memory 202 that may operate in combination with a RS processing component 240 to perform the functions, methodologies (e.g., method 500 of FIG. 5), or methods presented in the present disclosure. In accordance with the present disclosure, the RS processing component 240 may include a parameter indicating component 242 for indicating one or more parameters to the UE 115 generating or applying a beamforming matrix, transmitting an associated beamformed RS, etc., and a normalization vector receiving component 244 for obtaining a normalization vector used by the UE 115 to normalize power for transmitting the beamformed RS. For example, RS processing component 240 may transmit the one or more parameters and/or receive a beamformed SRS, normalization vector, etc. over one or more communication links 125.

The one or more processors 205 may include a modem 220 that uses one or more modem processors. The various functions related to the RS processing component 240, and/or its sub-components, may be included in modem 220 and/or processor 205 and, in an aspect, can be executed by a single processor, while in other aspects, different ones of the functions may be executed by a combination of two or more different processors. For example, in an aspect, the one or more processors 205 may include any one or any combination of a modem processor, or a baseband processor, or a digital signal processor, or a transmit processor, or a transceiver processor associated with transceiver 270, or a system-on-chip (SoC). In particular, the one or more processors 205 may execute functions and components included in the RS processing component 240. In another example, RS processing component 240 may operate at one or more communication layers, such as a PDCP layer, an RLC layer, etc., to configure parameters for transmitting a beamformed RS.

In some examples, the RS processing component 240 and each of the sub-components may comprise hardware, firmware, and/or software and may be configured to execute code or perform instructions stored in a memory (e.g., a computer-readable storage medium, such as memory 202 discussed below). Moreover, in an aspect, the base station 105 in FIG. 2 may include a radio frequency (RF) front end 290 and transceiver 270 for receiving and transmitting radio transmissions to, for example, UEs 115. The transceiver 270 may coordinate with the modem 220 to receive signals for, or transmit signals generated by, the RS processing component 240 to the UEs. RF front end 290 may be connected to one or more antennas 273, 274 and can include one or more switches 292, one or more amplifiers (e.g., power amplifiers (PAs) 294 and/or low-noise amplifiers 291), and one or more filters 293 for transmitting and receiving RF signals on uplink channels and downlink channels, transmitting and receiving beamformed signals, etc. In an aspect, the components of the RF front end 290 can connect with transceiver 270. The transceiver 270 may connect to one or more of modem 220 and processors 205.

The transceiver 270 may be configured to transmit (e.g., via transmitter (TX) radio 275) and receive (e.g., via receiver (RX) radio 280) wireless signals through antennas 273, 274 via the RF front end 290. In an aspect, the transceiver 270 may be tuned to operate at specified frequencies such that the base station 105 can communicate with, for example, UEs 115. In an aspect, for example, the modem 220 can configure the transceiver 270 to operate at a specified frequency and power level based on the configuration of the base station 105 and communication protocol used by the modem 220.

The base station 105 in FIG. 2 may further include a memory 202, such as for storing data used herein and/or local versions of applications or RS processing component 240 and/or one or more of its sub-components being executed by processor 205. Memory 202 can include any type of computer-readable medium usable by a computer or processor 205, such as random access memory (RAM), read only memory (ROM), tapes, magnetic discs, optical discs, volatile memory, non-volatile memory, and any combination thereof. In an aspect, for example, memory 202 may be a computer-readable storage medium that stores one or more computer-executable codes defining RS processing component 240 and/or one or more of its sub-components. Additionally or alternatively, the base station 105 may include a bus 211 for coupling one or more of the RF front end 290, the transceiver 274, the memory 202, or the processor 205, and to exchange signaling information between each of the components and/or sub-components of the base station 105.

In an aspect, the processor(s) 205 may correspond to one or more of the processors described in connection with the base station in FIG. 6. Similarly, the memory 202 may correspond to the memory described in connection with the base station in FIG. 6.

Referring to FIG. 3, a block diagram 300 is shown that includes a portion of a wireless communications system having multiple UEs 115 in communication with a base station 105 via communication links 125, where the base station 105 is also connected to a network 210. The UEs 115 may be examples of the UEs described in the present disclosure that are configured to generate and transmit beamformed RSs. Moreover the base station 105 may be an example of the base stations described in the present disclosure (e.g., eNB, gNB, etc. providing one or more macrocells, small cells, etc.) that are configured to process beamformed RSs received from one or more UEs.

In an aspect, the UE 115 in FIG. 3 may include one or more processors 305 and/or memory 302 that may operate in combination with a RS beamforming component 340 to perform the functions, methodologies (e.g., method 400 of FIG. 4), or methods presented in the present disclosure. In accordance with the present disclosure, the RS beamforming component 340 may optionally include a parameter receiving component 342 for obtaining one or more parameters for beamforming one or more RSs for transmitting to a base station 105, and/or a normalization vector component 344 for indicating a normalization vector to the base station 105 for use in processing the beamformed RS received from the UE 115. For example, RS beamforming component 340 may generate and transmit the beamformed RSs over one or multiple antennas 373, 374 to the base station 105 via one or more communication links 125.

The one or more processors 305 may include a modem 320 that uses one or more modem processors. The various functions related to the RS beamforming component 340, and/or its sub-components, may be included in modem 320 and/or processor 305 and, in an aspect, can be executed by a single processor, while in other aspects, different ones of the functions may be executed by a combination of two or more different processors. For example, in an aspect, the one or more processors 305 may include any one or any combination of a modem processor, or a baseband processor, or a digital signal processor, or a transmit processor, or a transceiver processor associated with transceiver 370, or a system-on-chip (SoC). In particular, the one or more processors 305 may execute functions and components included in the RS beamforming component 340. In another example, RS beamforming component 340 may operate at one or more communication layers, such as a PDCP layer, an RLC layer, etc., to process and/or prioritize packets or generate related PDUs over the one or more communication layers.

In some examples, the RS beamforming component 340 and each of the sub-components may comprise hardware, firmware, and/or software and may be configured to execute code or perform instructions stored in a memory (e.g., a computer-readable storage medium, such as memory 302 discussed below). Moreover, in an aspect, the UE 115 in FIG. 3 may include an RF front end 390 and transceiver 370 for receiving and transmitting radio transmissions to, for example, base stations 105. The transceiver 370 may coordinate with the modem 320 to generate and/or transmit signals that include the packets (e.g., and/or one or more related PDUs) as generated by the RS beamforming component 340. RF front end 390 may be connected to one or more antennas 373, 374 and can include one or more switches 392, one or more amplifiers (e.g., PAs 394 and/or LNAs 391), and one or more filters 393 for transmitting and receiving RF signals on uplink channels and downlink channels. In an aspect, the components of the RF front end 390 can connect with transceiver 370. The transceiver 370 may connect to one or more of modem 320 and processors 305.

The transceiver 370 may be configured to transmit (e.g., via transmitter (TX) radio 375) and receive (e.g., via receiver (RX) radio 380) beamformed or non-beamformed wireless signals through antennas 373, 374 via the RF front end 390. In an aspect, the transceiver 370 may be tuned to operate at specified frequencies such that the UE 115 can communicate with, for example, base stations 105. In an aspect, for example, the modem 320 can configure the transceiver 370 to operate at a specified frequency and power level based on the configuration of the UE 115 and communication protocol used by the modem 320.

The UE 115 in FIG. 3 may further include a memory 302, such as for storing data used herein and/or local versions of applications or RS beamforming component 340 and/or one or more of its sub-components being executed by processor 305. Memory 302 can include any type of computer-readable medium usable by a computer or processor 305, such as RAM, ROM, tapes, magnetic discs, optical discs, volatile memory, non-volatile memory, and any combination thereof. In an aspect, for example, memory 302 may be a computer-readable storage medium that stores one or more computer-executable codes defining RS beamforming component 340 and/or one or more of its sub-components. Additionally or alternatively, the UE 115 may include a bus 311 for coupling one or more of the RF front end 390, the transceiver 374, the memory 302, or the processor 305, and to exchange signaling information between each of the components and/or sub-components of the UE 115.

In an aspect, the processor(s) 305 may correspond to one or more of the processors described in connection with the UE in FIG. 6. Similarly, the memory 302 may correspond to the memory described in connection with the UE in FIG. 6.

FIG. 4 illustrates a flow chart of an example of a method 400 for generating and transmitting (e.g., by a transmitter, such as a UE) a beamformed RS for receiving and processing by a receiver (e.g., a base station).

At Block 402, the transmitter may receive an indication of at least one of a beamforming method for beamforming a RS or a normalization method for normalizing power for beamforming the RS. In an aspect, parameter receiving component 342, e.g., in conjunction with processor(s) 305, memory 302, transceiver 370, and/or RS beamforming component 340, can receive the indication of at least one of the beamforming method for beamforming the RS or the normalization method for normalizing power for beamforming the RS. For example, parameter receiving component 342 may receive the indication from the base station 105, from memory 302, and/or the like. In this regard, the beamforming method and/or normalization method may be indicated by the base station 105, indicated in a specification (e.g., and accordingly stored or configured in memory 302 of the UE 115), etc.

In an example, parameter receiving component 342 may receive the indication of the normalization method from the base station 105, which may include receiving the indication over layer 1 signaling (e.g., via a downlink control information (DCI) format), layer 2 signaling (e.g., MAC layer signaling), higher layer signaling (e.g., RRC layer signaling), and/or the like. In an example, parameter receiving component 342 may receive the indication as a semi-static configuration that may change infrequently, or as a dynamic configuration that may change over time (e.g., when a new configuration is received, etc.). In an example, where the configuration is dynamic, parameter receiving component 342 may receive the configuration semi-persistently (e.g., according to an interval). Moreover, for example, parameter receiving component 342 can receive the indication for transmitting an RS for a wideband and/or different indications for transmitting an RS for different subbands or groups of subbands. In addition, for example, a different method of signaling may be used for different clusters of subbands. For example, signaling used for subbands 1 and 3 may be different than subbands used for subbands 2 and 4.

In another example, parameter receiving component 342 may receive the indication of the beamforming method from the base station 105, which may include receiving the indication to beamform one port per symbol of a subframe, one port per resource block (RB), which may be cycled (e.g., such that beamforming for port 0 may occur in RBs indexed at 0, 4, 8, etc. for 4 antenna port UE, beamforming for port 1 may occur in RBs indexed at 1, 5, 9, etc. for 4 antenna port UE, etc.), one port per subband, etc. In another example, parameter receiving component 342 may receive the indication for wideband beamforming (e.g., for discrete Fourier transform (DFT) spread OFDM (DFT-S-OFDM)) where beamforming can occur for 1 symbol per subband with the same beamforming for the entire subband (e.g., for power limited UEs).

In one example, the normalization methods and/or beamforming methods may correspond to an index, and the base station 105 may indicate an index, which the RS beamforming component 340 can appropriately map to a given normalization method and/or beamforming method. In another example, the base station 105 may indicate one or more parameters corresponding to the normalization method and/or beamforming method, from which the RS beamforming component 340 may determine the associated normalization method and/or beamforming method.

At Block 404, the transmitter may generate a channel covariance matrix corresponding to interference over a plurality of antennas. In an aspect, RS beamforming component 340, e.g., in conjunction with processor(s) 305, memory 302, and/or transceiver 370, can generate the channel covariance matrix corresponding to interference over the plurality of antennas. For example, RS beamforming component 340 can measure interference over each of n antennas of the UE, and can generate a n×n channel covariance matrix representing interference over the n antennas. In previous configurations, the UE 115 reported the channel covariance matrix to the base station 105 to allow the base station 105 to determine the interference experienced by the UE 115 over its antennas. This requires transmitting n2 real numbers, which can be burdensome for the UE 115. This explicit feedback of interference from UE to eNB may not be desirable. As discussed above, the number of bits to feedback per RB value to signal interference may be quite large, e.g., 16 real numbers for a 4×4 matrix. Accordingly, the UE 115 can instead transmit beamformed SRSs to the base station 105, where the UE 115 can beamform the SRSs along directions where the UE 115 can nullify interference and maximize downlink signal-to-interference-and-noise ratio (SINR). If rank related decisions are being made at the eNB, the SRS beamforming may use additional support in a TDD system because transmitting SRS along orthogonal directions to nullify the interference may not be enough. In one example, power normalization factors may be sent on the UL to the eNB. The quality of the downlink signals received by the UE may be, in part, determined by beamforming weighting vectors. Also, the UE may use power normalization to normalize the interference.

Accordingly, at Block 406, the transmitter may generate a RS beamforming matrix based at least in part on modifying the channel covariance matrix and the normalization method. In this example, the eNB can have 32 antennas, the UE can have 4 antennas, and the H matrix on the UL is a 32×4 matrix, where H is the channel response matrix. Rnn is a noise covariance matrix. In an aspect, RS beamforming component 340, e.g., in conjunction with processor(s) 305, and/or memory 302, can generate the RS beamforming matrix based at least in part on modifying the channel covariance matrix and the normalization method. For example, RS beamforming component 340 may generate the RS beamforming matrix by applying one or more operations to the channel covariance matrix, such as Cholesky factorization of the channel covariance matrix, Rnn, and an upper triangular matrix, "upper." For example, RS beamforming component 340 can generate the beamforming matrix U=Cholesky (Rnn, "upper") to yield:

$$U = \begin{pmatrix} u_{00} & u_{01} & u_{02} & u_{03} \\ 0 & u_{11} & u_{12} & u_{13} \\ 0 & 0 & u_{22} & u_{23} \\ 0 & 0 & 0 & u_{33} \end{pmatrix}$$

where the numbers on the upper diagonal can be complex numbers. Cholesky decomposition may be used to minimize numeric operations. The columns of U may not be of unit power, however, and thus can be normalized as described herein. For example, RS beamforming component 340 can normalize the beamforming matrix by using a same power per port such that each column may have unit power. In another example, RS beamforming component 340 can normalize the beamforming matrix by normalizing each column of the upper triangular matrix to a ratio of a unit power determined based on an index of the column and a total number of columns of the upper triangular matrix using same power on average per antenna (e.g., normalizing the first column of U to 1/n, second column to 2/n, . . . nth column to n/n, etc.), and/or the like.

In one example, in generating the RS beamforming matrix at Block 406, the transmitter may optionally, at Block 408, normalize the RS beamforming matrix based on the normalization method. In an aspect, RS beamforming component 340, e.g., in conjunction with processor(s) 305, and/or memory 302, can normalize the RS beamforming matrix based on the normalization method. As described, for example, RS beamforming component 340 may determine the normalization method based on a received indication (e.g., from base station 105, from memory 302, etc.), and can apply the normalization method to normalize power in the beamforming matrix. For instance, RS beamforming component 340 may normalize the power by applying a same power per port such that each column of U can have unit power. In another example, RS beamforming component 340 may normalize the power by apply a same power on average per antenna such that the first column of U is normalized to ¼, the second to ½, the third to ¾, and the fourth to 1, in the example above. This normalized beamforming matrix can be used to transmit the beamformed RS, as described below.

In addition, in one example, the transmitter may optionally, at Block 410, indicate a normalization vector corresponding to normalizing the RS beamforming matrix. In an aspect, normalization vector component 344, e.g., in conjunction with processor(s) 305, memory 302, and/or RS beamforming component 340, can indicate the normalization vector corresponding to normalizing the RS beamforming matrix. For example, normalization vector component 344 can construct the normalization vector to include the normalization determined for each column of U, and thus the normalization vector may include n elements (e.g., or n−1 where the last column may be understood to have unit power). The overhead associated indicating the normalization vector can be less than that associated with indicating the entire channel covariance matrix (e.g., a factor of n less overhead).

For example, normalization vector component 344 can indicate the normalization vector, or one or more values computed therefrom, to the base station 105. For instance, normalization vector component 344 can indicate a single value per RB averaged across columns of U (e.g., 1 floating point real value, which can be quantized to a number of bits, per RB). In another example, normalization vector component 344 can indicate the full normalization vector per RB. In another example, normalization vector component 344 can indicate the normalization vector as subsampled across RBs (e.g., once per a number of RBs or subbands/precoding resource group (PRG)). Moreover, in an example, normalization vector component 344 can indicate the normalization vector as averaged across a number of RBs. In any case, the base station 105 can obtain the normalization, as described herein, and utilize the normalization vector to process the RS received from the UE 115. Additionally, in an example, normalization vector component 344 can indicate the normalization vector according to a periodicity that may be different from RS transmission (and thus may be configured separately, e.g., by the base station 105 or otherwise). Also, the normalization vector could be triggered jointly or separately from the RS transmission. If the interference magnitude is not changing rapidly, the normalization vector may not need to be sent as often as the RS. For example, normalization vector component 344 can indicate the normalization vector in slot 1+k, where the RS transmission occurs in slot 1, and k is configured for transmitting the normalization vector (e.g., configured by base station 105 or otherwise at the UE 115). In another example, in this regard, normalization vector reporting can be triggered separately from RS transmission altogether.

At Block 412, the transmitter may optionally generate the RS based on the beamforming method and/or the RS beamforming matrix. In an aspect, RS beamforming component 340, e.g., in conjunction with processor(s) 305, memory 302, and/or transceiver 370, can generate the RS based on the beamforming method and/or the RS beamforming matrix. For example, RS beamforming component 340 may generate the RS, which may include a sounding RS (SRS), as a beamformed RS by applying the RS beamforming matrix, and may do so according to the beamforming method. For example, as described, the indicated beamforming method may include generating a beamformed RS for 1 port per each of a plurality of symbols in one or more subframes, per one or more RBs (e.g., cycled through the RBs, as described, or otherwise), per subband, or wideband beamforming, etc. RS beamforming component 340 may accordingly generate the beamformed RS based on the indicated beamforming method.

At Block 414, the transmitter may transmit the RS based on the RS beamforming matrix. In an aspect, RS beamforming component 340, e.g., in conjunction with processor(s) 305, memory 302, and/or transceiver 370, can transmit the RS based on the RS beamforming matrix. For example, RS beamforming component 340 can apply corresponding powers to the multiple antennas of the UE 115 in transmitting the RS to the base station 105. As described below, the base station 105 can receive the RS (and/or the normalization vector) and process the RS to determine parameters for uplink communications (e.g., a rank for the UE 115 to use in transmitting uplink communications).

FIG. 5 illustrates a flow chart of an example of a method 500 for processing (e.g., by a receiver, such as a base station) RSs received from one or more transmitters.

In method 500, at Block 502, the receiver can optionally transmit an indication of at least one of a beamforming method for beamforming a RS or a normalization method for normalizing power for beamforming the RS. In an aspect, parameter indicating component 242, e.g., in conjunction with processor(s) 205, memory 202, transceiver 270, and/or RS processing component 240, can transmit the indication of at least one of the beamforming method for beamforming the RS or the normalization method for normalizing power for beamforming the RS (e.g., to UE 115). For example, parameter indicating component 242 can transmit the indication in layer 1 signaling, layer 2 signaling, higher layer signaling, etc., as described. The indication may include an index indicating the normalization method and/or the beamforming method (e.g., out of a plurality of such methods), where the UE 115 may store one or more parameters related to determining the method from the index. In another example, parameter indicating component 242 can transmit the indication as one or more parameters related to the normalization method and/or the beamforming method, from which the UE 115 can determine the normalization method and/or the beamforming method. Additionally, as described, the normalization methods may relate to normalizing power per antenna port, normalizing the same power on average per antenna port, etc., and/or the beamforming methods can include whether to transmit a beamformed RS for 1 antenna port per symbol, RB (and/or whether to cycle ports over the RBs), subband, etc., whether to transmit wideband beamformed RSs, and/or the like.

At Block 504, the receiver can receive a RS generated based on a RS beamforming matrix, which is computed from a channel covariance matrix and the normalization method, and/or transmitted based on the beamforming matrix. In an aspect, RS processing component 240, e.g., in conjunction with processor(s) 205, memory 202, and/or transceiver 270, can receive the RS generated based on the RS beamforming matrix, which is computed from a channel covariance matrix and the normalization method, and/or transmitted based on the beamforming matrix. For example, RS processing component 240 can receive the RS based on the specified beamforming method (e.g., beamformed for 1 antenna port per symbol, RB, subband, etc., as wideband beamformed, etc.). Moreover, as described, the RS may be an SRS transmitted by the UE 115 over communication resources configured by the base station 105 over one or more of communication links 125.

At Block 506, the receiver can optionally receive a normalization vector corresponding to the RS. In an aspect, normalization vector receiving component 244, e.g., in conjunction with processor(s) 205, memory 202, transceiver 270, and/or RS processing component 240, can receive the normalization vector corresponding to the RS. As described, the normalization vector can include a vector of values, a single value, etc. indicating normalization used for generating the RS from a RS beamforming matrix, and the RS processing component 240 can process the RS based on this normalization vector to determine values of the beamforming matrix, from which the channel covariance matrix or other interference information corresponding to the antenna ports of the UE 115 can be estimated. As described, for example, the normalization vector may include a single value averaged for normalization performed for each column of the RS beamforming matrix, U, by the UE 115, a vector of normalization values for the columns of U, a vector of normalization values for the columns of U across multiple RBs, a vector of normalization values for the columns of U as averaged over multiple RBs, etc. Moreover, as described, normalization vector receiving component 244 can receive the normalization vector based on a different periodicity or time schedule than the RS, and thus, in one example a given normalization vector can be used to process multiple RSs transmitted by the UE 115 over a period of time.

Additionally, in one example, parameter indicating component 242 can indicate one or more parameters for generating the normalization vector (e.g., a normalization vector generation method to include the full vector, a single averaged value, etc.), one or more parameters for reporting the normalization vector, etc. to the UE 115. In this example, parameter receiving component 342 can receive the one or more parameters, and utilize the one or more parameters in generating and/or transmitting the normalization vector.

At Block 508, the receiver can process, based on at least one of the beamforming method or the normalization method, the RS received from the UE. In an aspect, RS processing component 240, e.g., in conjunction with processor(s) 205, memory 202, and/or transceiver 270, can process, based on at least one of the beamforming method or the normalization method, the RS received from the UE 115. For example, RS processing component 240 may determine whether the RS is beamformed for one antenna port per symbol, RB, subband, cycled per RB, indicated as a wideband beamformed RS, etc., and can accordingly process the RS for one or more associated antenna ports. Moreover, as described, RS processing component 240 can process the beamformed RS based on the normalization vector to determine feedback corresponding to the channel covariance matrix determined by the UE 115, which can be used to schedule resources for the UE 115, as described.

In one example, in processing the RS at Block 508, the receiver may optionally, at Block 510, determine a rank for scheduling uplink communications for the UE based on processing the RS. In an aspect, RS processing component 240, e.g., in conjunction with processor(s) 205, memory 202, and/or transceiver 270, can determine the rank (e.g., the number of antennas for a UE 115) for scheduling uplink communications for the UE based on processing the RS. For example, RS processing component 240 may determine channel conditions or interference related parameters for each antenna based on the beamformed RS, the normalization vector, etc., and can accordingly determine which antennas the UE 115 can use (e.g., the rank) to communicate with the base station 105. The base station 105 may accordingly signal, to the UE 115, the determined rank and/or an uplink resource grant generated based on the determined rank.

Figure 6:
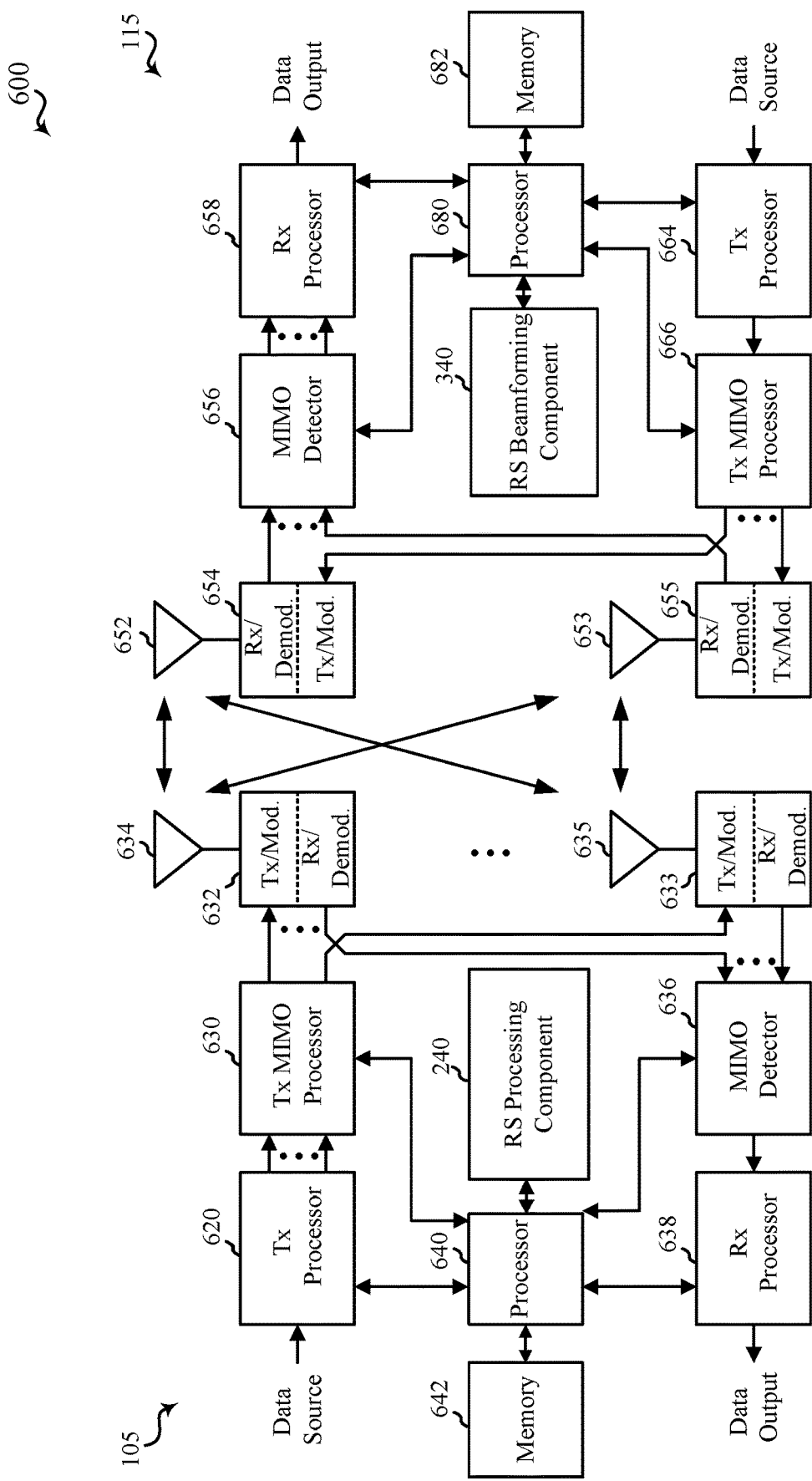
FIG. 6 is a block diagram illustrating an example of a MIMO communication system including a base station and a UE, in accordance with various aspects of the present disclosure.

FIG. 6 is a block diagram of a MIMO communication system 600 including a base station 105 and a UE 115. The MIMO communication system 600 may illustrate aspects of the wireless communication system 100 described with reference to FIG. 1. The base station 105 may be an example of aspects of the base station 105 described with reference to FIGS. 1, 2, and 3. The base station 105 may be equipped with antennas 634 and 635, and the UE 115 may be equipped with antennas 652 and 653. In the MIMO communication system 600, the base station 105 may be able to send data over multiple communication links at the same time. Each communication link may be called a "layer" and the "rank" of the communication link may indicate the number of layers used for communication. For example, in a 2×2 MIMO communication system where base station 105 transmits two "layers," the rank of the communication link between the base station 105 and the UE 115 is two.

At the base station 105, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 115 may be an example of aspects of the UEs 115 described with reference to FIGS. 1, 2, and 3. At the UE 115, the UE antennas 652 and 653 may receive the DL signals from the base station 105 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 115 to a data output, and provide decoded control information to a processor 680, or memory 682.

The processor 680 may in some cases execute stored instructions to instantiate a RS beamforming component 340 (see e.g., FIGS. 1 and 3).

On the uplink (UL), at the UE 115, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 105 in accordance with the communication parameters received from the base station 105. At the base station 105, the UL signals from the UE 115 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a RS processing component 240 (see e.g., FIGS. 1 and 2).

The components of the UE 115 may, individually or collectively, be implemented with one or more ASICs adapted to perform some or all of the applicable functions in hardware. Each of the noted modules may be a means for performing one or more functions related to operation of the MIMO communication system 600. Similarly, the components of the base station 105 may, individually or collectively, be implemented with one or more ASICs adapted to perform some or all of the applicable functions in hardware. Each of the noted components may be a means for performing one or more functions related to operation of the MIMO communication system 600.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for transmitting reference signals (RSs) in wireless communications, comprising:
receiving, from an access point, an indication of at least one of a beamforming method for beamforming a RS or a normalization method for normalizing power for beamforming the RS;
generating a channel covariance matrix corresponding to interference over a plurality of antenna ports;
generating a RS beamforming matrix based at least in part on modifying the channel covariance matrix and on the normalization method;
generating the RS based on the RS beamforming matrix and the beamforming method; and
transmitting, to the access point, the RS based on the RS beamforming matrix.

2. The method of claim 1, further comprising normalizing the RS beamforming matrix using the normalization method.

3. The method of claim 2, wherein receiving the indication comprises receiving the indication of the normalization method indicating to normalize an average power per antenna, and wherein generating the RS beamforming matrix comprises modifying the channel covariance matrix to an upper triangular matrix, and normalizing each column of the upper triangular matrix to a ratio of a unit power determined based on an index of the column and a total number of columns of the upper triangular matrix.

4. The method of claim 2, wherein receiving the indication comprises receiving the indication of the normalization method indicating to normalize per antenna port, and wherein generating the RS beamforming matrix comprises modifying the channel covariance matrix to an upper triangular matrix, and normalizing each column of the upper triangular matrix to a unit power.

5. The method of claim 2, further comprising indicating, to the access point, a normalization vector corresponding to normalizing the RS beamforming matrix.

6. The method of claim 5, wherein indicating the normalization vector comprises indicating a single value per resource block averaged across columns of the RS beamforming matrix.

7. The method of claim 5, wherein indicating the normalization vector comprises indicating the normalization vector per resource block for each column of the RS beamforming matrix.

8. The method of claim 5, wherein indicating the normalization vector comprises indicating the normalization vector for each column of the RS beamforming matrix as subsampled over multiple resource blocks.

9. The method of claim 5, wherein indicating the normalization vector comprises indicating the normalization vector for each column of the RS beamforming matrix as averaged over multiple resource blocks.

10. The method of claim 5, wherein indicating the normalization vector comprises indicating the normalization vector over a period of time based on a periodicity.

11. The method of claim 10, wherein the periodicity is different from a periodicity related to transmitting the RS.

12. The method of claim 1, wherein receiving the indication of at least one of the beamforming method or the normalization method comprises receiving the indication of at least one of the beamforming method or the normalization method in at least one of physical layer signaling, media access control layer signaling, or radio resource control layer signaling.

13. The method of claim 1, wherein receiving the indication comprises receiving the indication of the beamforming method indicating at least one of beamforming over one port per symbol, one port per resource block, one port per subband, or one symbol per subband with same beamforming for the subband.

14. A method for configuring reference signals (RSs) transmissions in wireless communications, comprising:
transmitting, to a user equipment (UE), an indication of at least one of a beamforming method for beamforming an RS or a normalization method for normalizing power for beamforming the RS;
receiving, from the UE, a RS generated based on a RS beamforming matrix, computed from a channel covariance matrix determined by the UE and the normalization method; and
processing, based on at least one of the beamforming method or the normalization method, the RS received from the UE to determine interference for the UE.

15. The method of claim 14, wherein transmitting the indication comprises transmitting the indication of the normalization method indicating to normalize an average power per antenna or to normalize per antenna port.

16. The method of claim 14, further comprising receiving, from the UE, a normalization vector corresponding to normalizing the RS beamforming matrix.

17. The method of claim 16, wherein receiving the normalization vector comprises receiving a single value per resource block averaged across columns of the RS beamforming matrix.

18. The method of claim 16, wherein receiving the normalization vector comprises receiving the normalization vector per resource block for each column of the RS beamforming matrix.

19. The method of claim 16, wherein receiving the normalization vector comprises receiving the normalization vector for each column of the RS beamforming matrix as subsampled over multiple resource blocks.

20. The method of claim 16, wherein receiving the normalization vector comprises receiving the normalization vector for each column of the RS beamforming matrix as averaged over multiple resource blocks.

21. The method of claim 16, wherein receiving the normalization vector comprises receiving the normalization vector over a period of time based on a periodicity.

22. The method of claim 21, wherein the periodicity is different from a periodicity related to receiving the RS.

23. The method of claim 14, wherein transmitting the indication of at least one of the beamforming method or the normalization method comprises transmitting the indication of at least one of the beamforming method or the normalization method in at least one of physical layer signaling, media access control layer signaling, or radio resource control layer signaling.

24. The method of claim 14, wherein transmitting the indication comprises transmitting the indication of the beamforming method indicating at least one of beamforming over one port per symbol, one port per resource block, one port per subband, or one symbol per subband with same beamforming for the subband.

25. An apparatus for transmitting reference signals (RSs) in wireless communications, comprising:
  means for receiving, from an access point, an indication of at least one of a beamforming method for beamforming a RS or a normalization method for normalizing power for beamforming the RS;
  means for generating a channel covariance matrix corresponding to interference over a plurality of antenna ports;
  means for generating a RS beamforming matrix based at least in part on modifying the channel covariance matrix and on the normalization method;
  means for generating the RS based on the RS beamforming matrix and the beamforming method; and
  means for transmitting, to the access point, the RS based on the RS beamforming matrix.

26. The apparatus of claim 25, further comprising means for normalizing the RS beamforming matrix using the normalization method.

27. The apparatus of claim 26, wherein the means for receiving the indication receives the indication of the normalization method indicating to normalize an average power per antenna, and wherein the means for generating the RS beamforming matrix modifies the channel covariance matrix to an upper triangular matrix, and normalizes each column of the upper triangular matrix to a ratio of a unit power determined based on an index of the column and a total number of columns of the upper triangular matrix.

28. The apparatus of claim 26, wherein the means for receiving the indication receives the indication of the normalization method indicating to normalize per antenna port, and wherein the means for generating the RS beamforming matrix modifies the channel covariance matrix to an upper triangular matrix, and normalizes each column of the upper triangular matrix to a unit power.

29. The apparatus of claim 26, further comprising means for indicating, to the access point, a normalization vector corresponding to normalizing the RS beamforming matrix.

30. The apparatus of claim 29, wherein the means for indicating the normalization vector indicates a single value per resource block averaged across columns of the RS beamforming matrix.

31. The apparatus of claim 29, wherein the means for indicating the normalization vector indicates the normalization vector per resource block for each column of the RS beamforming matrix.

32. The apparatus of claim 29, wherein the means for indicating the normalization vector indicates the normalization vector for each column of the RS beamforming matrix as subsampled over multiple resource blocks.

33. The apparatus of claim 29, wherein the means for indicating the normalization vector indicates the normalization vector for each column of the RS beamforming matrix as averaged over multiple resource blocks.

34. The apparatus of claim 29, wherein the means for indicating the normalization vector indicates the normalization vector over a period of time based on a periodicity.

35. The apparatus of claim 34, wherein the periodicity is different from a periodicity related to transmitting the RS.

36. The apparatus of claim 25, wherein the means for receiving the indication of at least one of the beamforming method or the normalization method receives the indication of at least one of the beamforming method or the normalization method in at least one of physical layer signaling, media access control layer signaling, or radio resource control layer signaling.

37. The apparatus of claim 25, wherein the means for receiving the indication receives the indication of the beamforming method indicating at least one of beamforming over one port per symbol, one port per resource block, one port per subband, or one symbol per subband with same beamforming for the subband.

38. An apparatus for configuring reference signals (RSs) transmissions in wireless communications, comprising:
  means for transmitting, to a user equipment (UE), an indication of at least one of a beamforming method for beamforming an RS or a normalization method for normalizing power for beamforming the RS;
  means for receiving, from the UE, a RS generated based on a RS beamforming matrix, computed from a channel covariance matrix determined by the UE and the normalization method; and
  means for processing, based on at least one of the beamforming method or the normalization method, the RS received from the UE to determine interference for the UE.

39. The apparatus of claim 38, wherein the means for transmitting the indication transmits the indication of the normalization method indicating to normalize an average power per antenna or to normalize per antenna port.

40. The apparatus of claim 38, further comprising means for receiving, from the UE, a normalization vector corresponding to normalizing the RS beamforming matrix.

41. The apparatus of claim 40, wherein the means for receiving the normalization vector receives a single value per resource block averaged across columns of the RS beamforming matrix.

42. The apparatus of claim 40, wherein the means for receiving the normalization vector receives the normalization vector per resource block for each column of the RS beamforming matrix.

43. The apparatus of claim 40, wherein the means for receiving the normalization vector receives the normalization vector for each column of the RS beamforming matrix as subsampled over multiple resource blocks.

44. The apparatus of claim 40, wherein the means for receiving the normalization vector receives the normalization vector for each column of the RS beamforming matrix as averaged over multiple resource blocks.

45. The apparatus of claim 40, wherein the means for receiving the normalization vector receives the normalization vector over a period of time based on a periodicity.

46. The apparatus of claim 45, wherein the periodicity is different from a periodicity related to receiving the RS.

47. The apparatus of claim 38, wherein the means for transmitting the indication of at least one of the beamforming method or the normalization method transmits the indication of at least one of the beamforming method or the normalization method in at least one of physical layer signaling, media access control layer signaling, or radio resource control layer signaling.

48. The apparatus of claim 38, wherein the means for transmitting the indication transmits the indication of the beamforming method indicating at least one of beamforming over one port per symbol, one port per resource block, one port per subband, or one symbol per subband with same beamforming for the subband.

49. An apparatus for wireless communication, comprising:
  a transceiver;
  a memory configured to store instructions; and
  one or more processors communicatively coupled with the transceiver and the memory, wherein the one or more processors are configured to execute the instructions to perform the operations of the method in claim 1.

50. A non-transitory computer-readable medium, comprising code executable by one or more processors to perform the operations of the method in claim 1.

* * * * *